US008581618B1

(12) United States Patent
Fritz

(10) Patent No.: US 8,581,618 B1
(45) Date of Patent: Nov. 12, 2013

(54) APPARATUS FOR CONTROLLING THE USABILITY OF INTELLECTUAL PROPERTY WITHIN A PROGRAMMABLE DEVICE AND METHOD OF USING

(75) Inventor: David Fritz, Pleasanton, CA (US)

(73) Assignee: Social Silicon, Inc., Pleasanton, CA (US)

( * ) Notice: Subject to any disclaimer, the term of this patent is extended or adjusted under 35 U.S.C. 154(b) by 66 days.

(21) Appl. No.: 13/396,057

(22) Filed: Feb. 14, 2012

(51) Int. Cl.
*H03K 19/00* (2006.01)
*H04L 9/08* (2006.01)

(52) U.S. Cl.
USPC .............. 326/8; 326/37; 380/46; 716/103

(58) Field of Classification Search
USPC ..................................... 326/8; 716/100–109
See application file for complete search history.

(56) References Cited

U.S. PATENT DOCUMENTS

| | | | | |
|---|---|---|---|---|
| 7,107,567 B1 * | 9/2006 | LeBlanc | ....................... | 716/106 |
| 7,987,358 B1 * | 7/2011 | Walstrum et al. | ............. | 713/160 |
| 7,987,373 B2 * | 7/2011 | McElvain | ..................... | 713/189 |
| 8,427,193 B1 * | 4/2013 | Trimberger | ........................ | 326/8 |
| 2010/0284539 A1 * | 11/2010 | Roy et al. | ...................... | 380/278 |

OTHER PUBLICATIONS

Couture et al., "Periodic Licensing of FPGA Based Intellectual Property," IEEE 2006.*
Couture et al., "Periodic Licensing of FPGA Based Intellectual Property," IEEE 2007.*
Maes et al., "A Pay-per-Use Licensing Scheme for Hardware IP Cores in Recent SRAM-Based FPGAs," IEEE Transactions on Information Forensics and Security, vol. 7, No. 1, Feb. 2012.*

* cited by examiner

*Primary Examiner* — Shawki Ismail
*Assistant Examiner* — Nelson Correa
(74) *Attorney, Agent, or Firm* — Michael W. Caldwell

(57) ABSTRACT

A system provides for the distribution of intellectual property logic blocks from a source to a user wherein the user may use the logic blocks during development but is prevented from using the block in production without permission. A sensor is connected in parallel with a first signal from the block and in series with a second signal from the block. When activity on the first signal exceeds a predetermined count, the output of the second signal is corrupted. In some embodiments all such sensors are connected to an aggregator which allows all blocks to continue to operate until all of them have exceeded their predetermined activity count. A state machine compares the values of two keys, one stored within the block, to another value stored in the state machine controller, and allows the block to be used in production if the key values coincide.

17 Claims, 7 Drawing Sheets

but are concerned that a designer might download the logical block, program it into a field programmable device, and thereby be able to replicate the device, including the proprietary logic, for free.

APPARATUS FOR CONTROLLING THE USABILITY OF INTELLECTUAL PROPERTY WITHIN A PROGRAMMABLE DEVICE AND METHOD OF USING

FIELD OF THE INVENTION

The present invention relates generally to programmable integrated circuits, and more particularly to the safe distribution of intellectual property for evaluation and logic development.

BACKGROUND

Field programmable devices, especially field programmable gate arrays, are often used by product designers for implementing the desired logic when prototyping a system, and sometimes for a production system. Their use involves combining digital logic gates to provide certain digital functions by the device. The logic may be completely created by the designer using logic descriptive codings, such as the well-known Verilog, RTL, and such. While such is needed for custom logic and the interconnect between functional blocks, designers often times purchase pre-designed logical blocks from third party vendors, reusing the vendors' intellectual property ("IP"). This is less expensive and more faithful since the blocks are well simulated and tested by the provider, making development of the final combined product faster. For example, one may buy a logical block for serial communication, buffer management, floating point calculating and such rather than "inventing" them from scratch.

Vendors of logical blocks are motivated to allow potential customers to try a logical block to verify operation, but are concerned that a designer might download the logical block, program it into a field programmable device, and thereby be able to replicate the device, including the proprietary logic, for free.

To date, the generally accepted solution to this problem has been the use of legal evaluation agreements between the vendor and prospective purchaser which limit the use of the logic to a short period of time and expressly prohibit its use in production products. Such legal solutions inhibit effective selling and marketing of third party logic blocks using modern techniques such as those used by other types of products on the internet.

Some IP vendors have implemented crude solutions by placing clock counters within their proprietary logic. The counters shut off a clock signal when the counter saturates (or, "counts out"), thereby making the chip unusable. The problems with this approach are threefold. First, the fact that the logic is a simple standard counter and tied to the clock makes it easy to detect and be disconnected by a skilled engineer, thereby defeating the protection mechanism. Second, such solutions are not cognizant of the fact that many logic blocks are likely to be placed into the same system to create interoperability, and therefore one block may arbitrarily shut off portions of the chip before other sections of have run long enough to show interoperability, making the total design difficult or impossible to verify. Third, it is a common practice to circumvent clock based systems simply by periodically resetting the system before the counters saturate.

What is needed for today's complex system designs to enable more effective selling techniques is a means of limiting the use of proprietary logic blocks within a functioning system that limits the functionality of the logic so as to make it unusable in a production environment while enabling its functionality and interoperability to be fully tested.

SUMMARY

In the various embodiments, the disclosed embodiment may include a sensor operatively connected to a clocked logic block without interfering with the operation of the clocked block. The sensor may detect when a selected signal in the clocked block has been exercised a selectable number of times. In some embodiments the vendor of the block may predetermine how many times the block may be exercised before the sensor reports use exceeding the predetermined number of times. When a sensor reports an excess use condition it may then cause the block to malfunction until a power on reset (POR) event resets the entire device. In some embodiments of the disclosure a sensor reports an excess use condition to an aggregator. The aggregator may allow all monitored blocks to function until all monitored blocks have reported an excess condition, at which time the aggregator causes all protected blocks to malfunction until a POR resets them all. Other embodiments may include a central signal aggregator to detect excess use and take a predetermined action in response.

In particular, a protected programmable device output is caused to malfunction when an aggregator determines that an excess use condition exists across all protected blocks, thereby rendering all protected blocks unusable. In any circuit complex enough to be commercially useful it would be impossible or at least extremely difficult for a designer to identify the sensor(s) and/or the aggregator and defeat their purpose. In one aspect a sensor eventually reports excess use of a block, even if the block has done nothing, thereby preventing a user from incorporating an unused block as a way to prevent an aggregator from declaring all blocks to have reached their excess use condition.

In some aspects of the present disclosure additional measures are taken to guard against a user attempting to derive the protection. A sensor plus other logic may be incorporated into an encapsulated module, wherein signal names are encrypted to prevent their interpretation, and input into the module are monitored to detect any unexpected behavior, a signature of tampering, and take action when such behavior is found.

By using the disclosed system, logical block vendors may allow customers to use the vendor's IP, without the customer utilizing the IP in production without explicit authorization by the vendor.

In the event that a design is deemed ready for production and all IP blocks contained within it have been duly purchased, the sensor attached to each IP block may be configured with an encryption key. If the key matches, the signal that makes the blocks malfunction will never be sent and the system will continue to function as designed.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

SPECIFICATION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The following disclosure is in the context of a system for protecting against the unauthorized use of IP logic of a third party, for example a vendor. However it is clear that the system is suitable for use by anyone with logic to be protected against unauthorized use, whether or not for from a third party.

Some elements on some figures are singular, and sometimes there are multiples. We may use reference numbers with no subscript or with a subscript interchangeably; the singular may also mean the multiple and multiple may mean the singular. Note that the subscript ".n" may be used to indicate an arbitrary number or repetitions, or it may not mean the maximum but a given instance. The following is a table of various signal symbols used herein and an example of their meaning.

| Symbol | Description |
|---|---|
| SAI | System ACK In signal |
| SAO | System ACK signal Out |
| FSI | First Saturation In signal |
| FSO | First Saturation Out signal |
| EVNT | Event signal |
| ASI | All Saturation In signal |
| ASO | All Saturated Out signal |
| SI | Saturation In signal |
| SO | Saturation Out signal |
| SF | Saturation Force signal |
| CLK | Local Clock |
| POR | Power On Reset |

Figure 1:
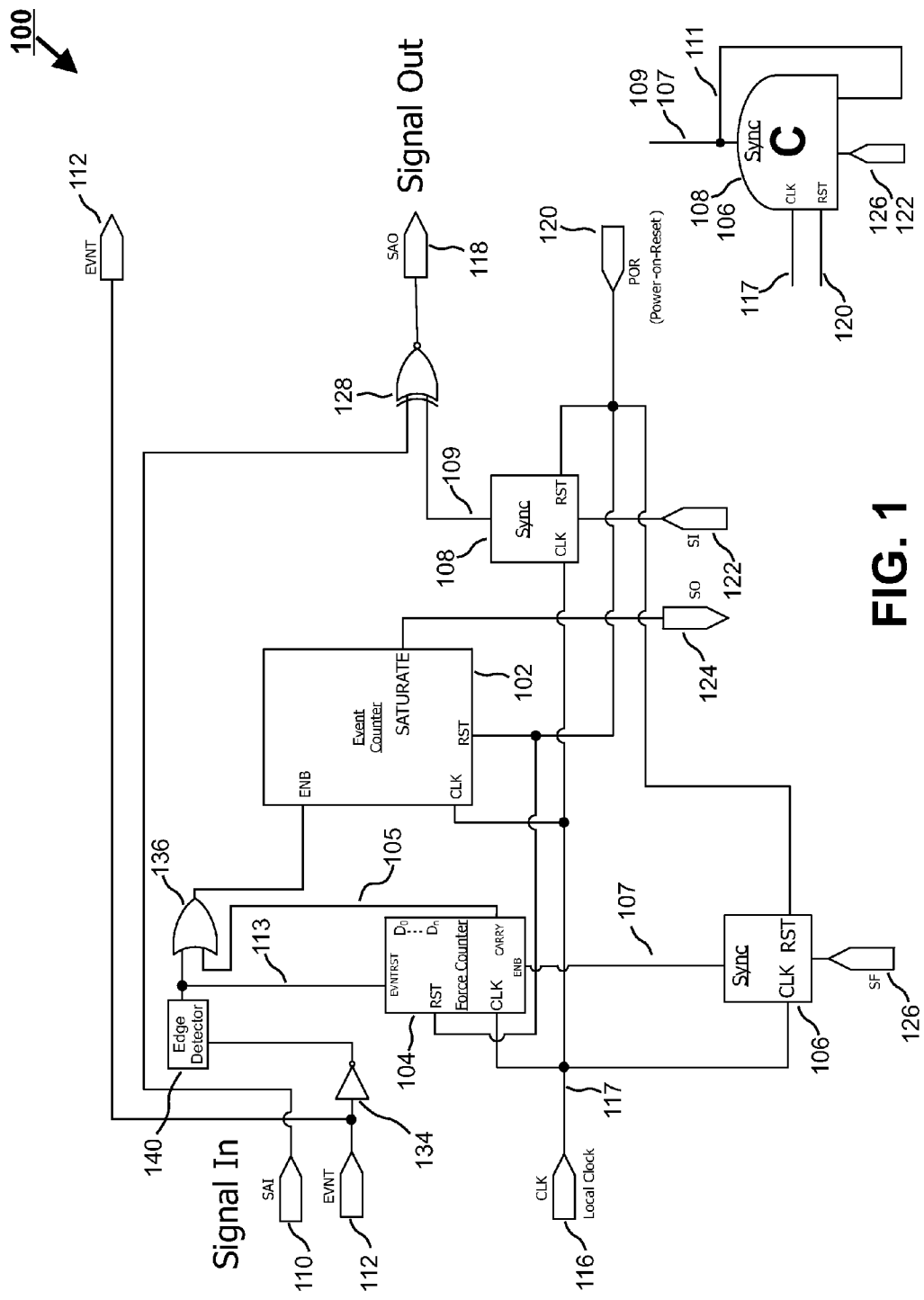
FIG. 1 is one aspect of a sensor.

Looking to FIG. 1, an example is shown of a sensor 100. At least one sensor 100 is associated with a given IP block, wherein the IP block may be provided by a vendor. A vendor providing an IP block for use in a system design predetermines how many events, for example ten thousand, the block may provide before the sensor associated with the block deems the block to have exceeded its allowed number of events.

Note the signals SAI 110 and EVNT 112. These are signals normally coming out of the protected (sensed) block (not shown). In the several aspects of the disclosure the signal SAI 110 is passed through to an output signal SAO 118 essentially unaltered. An IP block vendor selects the signal SAI 110 as the signal to be passed through to the output signal SAO 118. It is this signal which may be altered to provide an incorrect behavior when/if the sensor 100 (and optionally an aggregator, discussed further hereinafter) determines that the IP block as been used beyond the predetermined number of times the vendor will allow. The assertion of an incorrect behavior may be the result of other signals being combined with the SAI 110 signal at the XNOR gate 128; this will be disclosed in greater detail hereinafter.

In some aspects of the disclosure, the vendor may select a different signal from the IP block to be monitored by the sensor. In FIG. 1 this signal is denominated EVNT 112. In summary, the signal EVNT 112 is monitored to not exceed a certain predetermined value of counts, and if it exceeds the count the signal SAI 110 is altered such that the behavior of the signal SAO 118 is not correct. In but one example, the signal EVNT 112 may be a request for a transaction by the protected IP block, and the signal SAI 110 is an acknowledgement ("ACK") signal by the protected IP block that the transaction was received by the protected IP block. Note that in this configuration the signal EVNT 112, though monitored, is not corrupted when the number of events is exceeded. Thus, in the example shown, the sensor 100 is electrically connected in parallel with the signal EVNT 112 for monitoring, and in series with the signal SAI 110 for corruption when appropriate.

In some embodiments the signal SAI 110 is the same signal EVNT 112 that the vendor wishes to be monitored. In that case signal EVNT 112 and signal SAI 110 are simply electrically tied together ahead of any inverters. In this configuration essentially signal SAI 110 is monitored whilst being passed through to become the signal SAO 118 until such time as the number of signal SAI 110 events exceeds the predetermined maximum, at which time it is altered at the XNOR gate 128. Thus the XNOR gate 128 is a modifying circuit which modifies the signal 110 when the signal SI 122 is activated.

For clarity of description, we describe FIG. 1 as having different SAI 110 and EVNT 112 signals, though they may in fact be the same signal. The signal EVNT 112 may have an optional inverter 134 if EVNT 112 is an active low signal so that the event counter 102 counts clocks when an incoming enable signal from an OR gate 136 is TRUE. The signal EVNT 112 may be connected to an edge detector 140, which passes the signal EVNT 112 to an OR gate 136 upon a transition of EVNT 112. Disregarding the force counter 104, the signal EVNT 112 enables an event counter 102, which counts clock transitions at its input pin CLK. The edge detector 140 includes an input (not shown) for the CLK signal 116, thereby synchronizing its output (through the OR gate 136) to the ENB input and the CLK signal 116 of the event counter 102, thus the number of events counted by the event counter 102 corresponds to the number of EVNT 112 transitions.

The IP block vendor may determine the number of EVNT 112 signal transitions that will cause the event counter 102 to saturate. That is, when the maximum number of EVNT 112 transitions has been reached the signal SO 124 will go TRUE, for example HIGH. The event counter 102 will not then reset; it can only be reset by a POR 120 signal on the RST input terminal of the event counter 102. The signal SO 124, indicating that the number of events predetermined by the vendor has been exceeded, may be electrically connected to an aggregator, to be further disclosed hereinafter. In some aspects of the present disclosure an aggregator is not used, for example if a single IP block is protected by a single sensor 100. In that case the signal SO 124 may be inverted and connected to an input terminal of a synchronizer 108, thereby providing an active low signal SI 122. In some aspects the output of synchronizer 108 is such that once its output is active it will not change state until it receives a POR signal. In some embodiments a power on reset signal is connected to all reset inputs of a sensor 100, thereby preventing a simple reset signal from resetting the logic. Using a POR signal instead of a simple reset signal may make it more difficult for a circuit designer to successfully perform experiments in an attempt to defeat the security aspect of the present disclosure.

When an aggregator determines that all protected blocks have exceeded their predetermined even count, that is, when the signal SO 124 on all sensors 100 are active, the aggregator drives the signal SI 122 to its active state. In the example of FIG. 1, signal SI 122 is active LOW. The signal SI 122 is electrically connected to an input terminal of the XNOR gate 128 through a synchronizer 108, thereby making all sensors timing insensitive. The output of the XNOR 128 is the signal SAO 118, which logic receiving signal SAO 118 expects to be identical to signal SAI 110. The event counter 102 and synchronizer 108 receive local clock signal CLK 116 on a line 117.

When the event counter 102 saturates it may stop counting and drive its output signal SO 124 to the active state. The signal SO 124 does not change state until a power on reset signal POR 120 is received by the event counter 102. Likewise the synchronizer 108 may not change its state until it receives a POR signal 120. In this configuration the signal SAI 110 may continue to change state (if the IP block continues to operate) but the output signal SAO 118 is corrupted by the signal on line 109 from the synchronizer 108 when the signals are logically operated on by the XNOR gate 128. This may be seen in the Table 1 truth table. As Table 1 shows, the output signal SAO 118 of the sensor 100 corresponds to the input signal SAI 110 when the signal SI 122 is high. When the signal 122 is active (low), the output signal SAO 118 is corrupted to the complement of the input signal SAI 110. In this configuration, the selected output signal of all protected blocks may be corrupted at essentially the same time, making a determination of failure mode nearly impossible.

TABLE 1

| State | SAI 110 | SI 122 | SAI XOR SI | XNOR SAO 118 |
|---|---|---|---|---|
| Corrupted | 0 | 0 | 0 | 1 |
| Corrupted | 1 | 0 | 1 | 0 |
| Non Corrupted | 0 | 1 | 1 | 0 |
| Non Corrupted | 1 | 1 | 0 | 1 |

The sensor 100 can operate and be effective stand alone, particularly if only one IP block is being protected. For multiblock systems an aggregator function allows all protected blocks to continue to operate correctly until all have reported an excess event condition; that is, all SO 124 signals are active. However, in this context, a designer could fool the system and never cause a global corruption signal by simply including a logic block that is never exercised, hence never exceeds its predetermined event count.

To prevent such a situation, some embodiments include a force counter 104, wherein the force counter 104 counts clock signals CLK 116 and generates a carry signal on a line 105, electrically connected to an input terminal of an OR gate 136, if a predetermined maximum number of cycles is counted. The force counter 104 starts its count over whenever an event is seen at an input terminal EVNTRST on the line 113, thus activity by the block as monitored on the EVNT 112 signal (or SAI 110 if the two have been connected together) prevents the force counter 104 from incrementing the event counter 102. But if the line 113 does not toggle, or does not toggle enough for a predetermined time, the event counter 104 will eventually generate a carry signal and drive the ENB signal to the event counter 102 through the OR gate 136, which in turn will eventually saturate and drive the signal SO 124 to its active state. Note that the carry signal toggles each time the force counter 104 overflows, whereas the event counter 102 saturate signal holds its active state until a POR signal resets all blocks.

The force counter 104 count width in F bits is not defined by the vendor, to prevent one from trying to defeat the protection system by working around it. If the force counter 104 count value is too low the system may malfunction too quickly to verify the system design. In one embodiment the count value is found by:

$$F=\text{ceil}(\log_2(2^E*(C*P)))\qquad\text{[EQ1]}$$

where E is the number of bits used by the event counter 102, C is the average number of cycles between events as specified by the vendor, and P is the period of the local clock CLK 116. For example, consider:

$E = 32, C = 8, P = 1/100 \text{ MHz, then}$ $F = \text{ceil}(\log_2(2\wedge 32*(8*1/100{,}000{,}000)))$
$= \text{ceil}(8.425)$
$= 9.$ So in this example, force counter 104 will increment the event counter 102 every $2\wedge 9$ or 512 clock CLK 116 cycles if there is no activity on line 113.

The force counter 104 may be enabled by a signal to its ENB input terminal on a line 107 from a synchronizer 106. The synchronizer 106 is responsive to a signal SF 126, wherein the signal SF 126 indicates that, perhaps elsewhere in a total system design, at least one force counter 104 has been enabled, discussed in more detail hereinafter.

Synchronizers 106, 108 may be implemented in a variety of ways, and each may be implemented differently. For example, either (106, 108) may be implemented with flip-flops and a feedback signal, wherein once the output has changed state it will not change state back until a POR signal is received. In but another example, either may be a Muller-C block, as shown in FIG. 1 (as well as but not repeated in FIG. 5). In this example the output 109 of synchronizer 108 may be initialized as a logical HI, which will toggle to a LO upon a transition of the signal SI 122. Similarly, the output 107 of synchronizer 106 may be initialized as a logical LO, which will change state to a logical HI upon a transition of the signal SF126.

Figure 2:
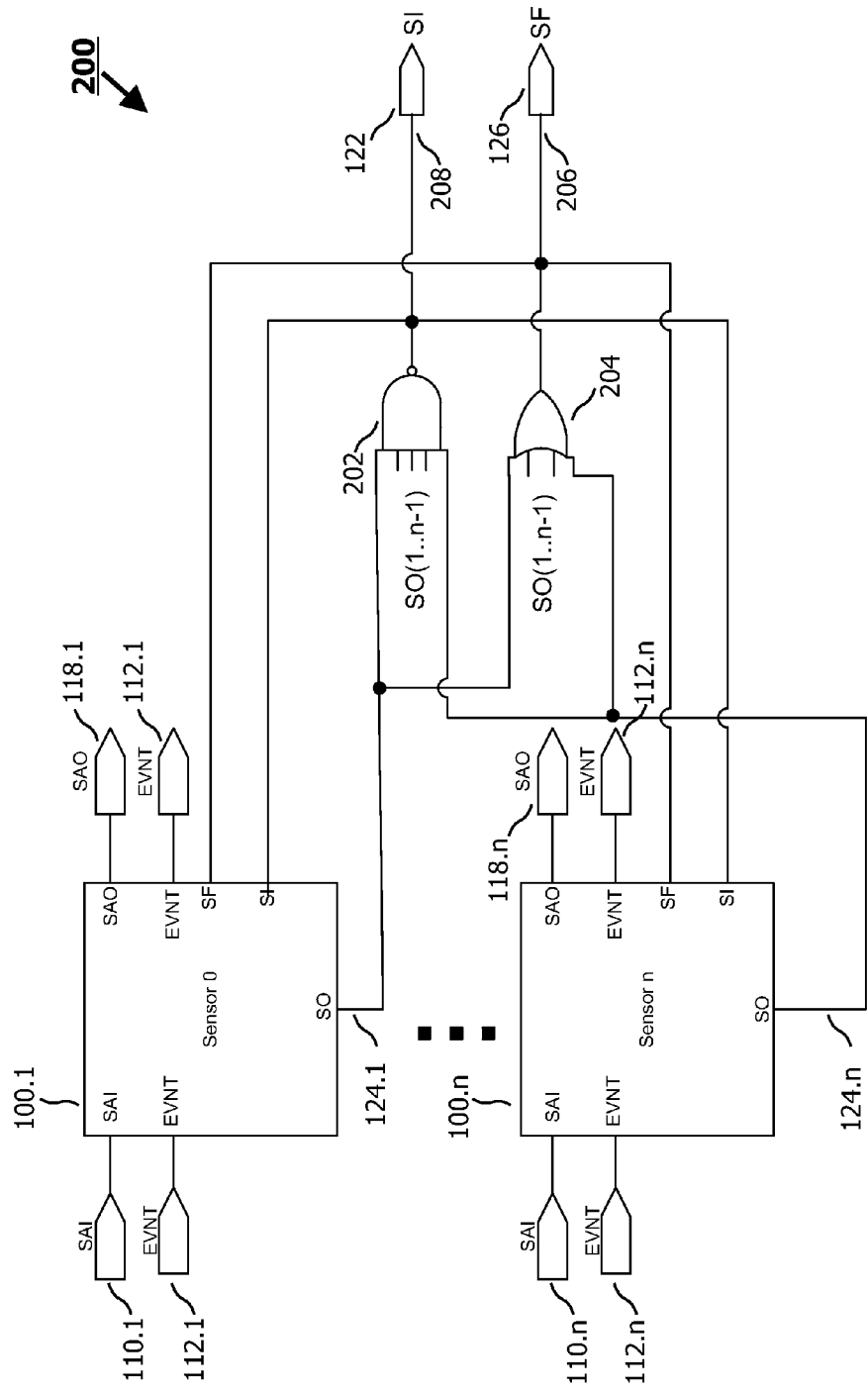
FIG. 2 is an example of a centralized aggregator.

A centralized aggregator 200, shown in FIG. 2, is an example of an aspect of the present disclosure comprising multiple protected blocks, each protected by a corresponding sensor 100.*n*. Each sensor 100.*n* provides an output signal SO 124.*n*. All SO 124.*n* signals are electrically connected to a NAND gate 202 input terminals and an OR gate 204 input terminals.

NAND gate 202 is an active LOW device. That is, it drives the signal SI 122 low when all SO 124.*n* inputs are HIGH. The active LOW signal SI 122 is in response to the condition of all sensors 100.*n* indicating that the block each is protecting has exceeded its predetermined number of monitored events.

When all sensor 100.*n* SO 124.*n* signals are active, SI 122 is driven LOW onto a line 208, providing the signal SI 122.*n* to all sensors 100.*n*, thereby causing the signals SAO 118.*n* to be the complement of their correct value. In some embodiments the XNOR 128 gate (as shown in FIG. 1, incorporated into each sensor 100.*n*) may be replaced by an AND gate, such that the signal SAO 118.*n* is held LOW constantly after signal SI 122 goes LOW. This configuration will prevent the monitored IP block from functioning, but may be easier to be detected. When gate 128 is an AND gate the signal SAI 110 may be inverted if it is an active LOW signal, then inverted again after the AND gate 128.

Similarly, OR gate 204 drives signal SF 126 LOW until at least one sensor 100.$n$ signal SO 124.$n$ is active (HIGH), driving the signal SF 126 HIGH. Note that an active signal SF 126 enables all force counters 104.$n$. This guarantees that all blocks will eventually saturate and malfunction even if no events are generated.

In some embodiments a distributed aggregator 300 monitors the state of all sensors 100.$n$. The logical strategy is similar to that of a central aggregator. That is, to enable all force counters 104.$n$ when the first sensor generates an active SO 124 signal, and to corrupt all outputs by driving the signal SI 122.$n$ active when all protected blocks have exceeded their predetermined event count. The advantages of a distributed aggregator 300 is that there is no localized place to attack to defeat the circuit, and that it enables tamper detection logic to be inserted as discussed below herein.

Figure 3:
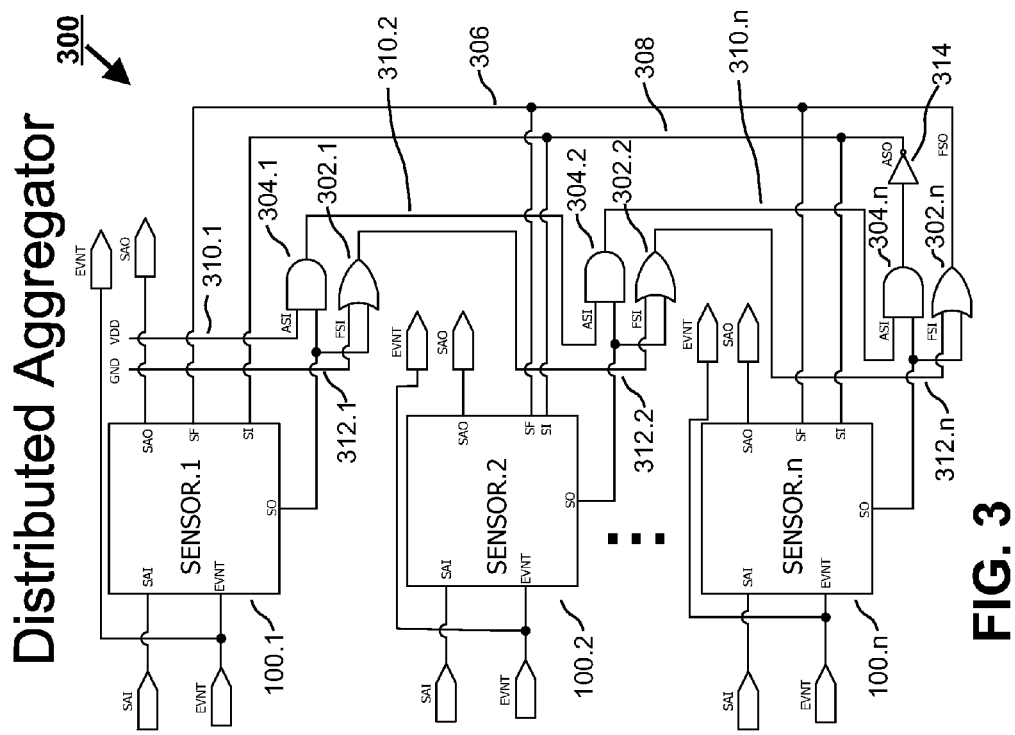
FIG. 3 is an example of a distributed aggregator.

Looking to FIG. 3, the signal SO 124.$n$ of each sensor 100.$n$ is electrically connected to an input terminal of a corresponding AND gate 304.$n$ and a corresponding OR gate 302.$n$. The AND gates 304.$n$ are all electrically connected in series, ANDing a signal SO 124.$n$ from its corresponding sensor 100.$n$ with the output of its upstream AND gate 304.(n-1). In the various embodiments the first AND gate in series 304.1 has its non-SO input terminal tied to TRUE. In other aspects the signal SO 124.1 output (that is, from the first in the series of sensors 100.1) goes directly to one of the two input terminals of the next AND gate 304.2). When all SO 124.$n$ signals are TRUE, the last AND gate 304.$n$ is active and inverter 314 drives all SI 124.$n$ signals via a line 308. Clearly a NAND gate could replace the last AND gate 304.$n$ and the inverter 314.

Detection of a first SO 124.$n$ TRUE signal, which will start all force counters 104.$n$, may be provided by an OR gate 302.$n$. One terminal of each OR gate 302.$n$ receives the output of its upstream OR gate 302.(n-1), and the other input terminal receives an SO 124.$n$ signal from a corresponding sensor 100.$n$. In the various embodiments the first OR gate in series 302.1 has its non-SO input terminal connected to FALSE. Thus when any sensor 100.$n$ signal SO 302.$n$ is TRUE its corresponding OR gate 302.$n$ has a active output; in the example of FIG. 3, active HIGH. All OR gates 302.$n$ are in series, thus when one goes TRUE they all will, driving a TRUE signal to all SF 126.$n$ input terminals on a line 306.

Figure 4:
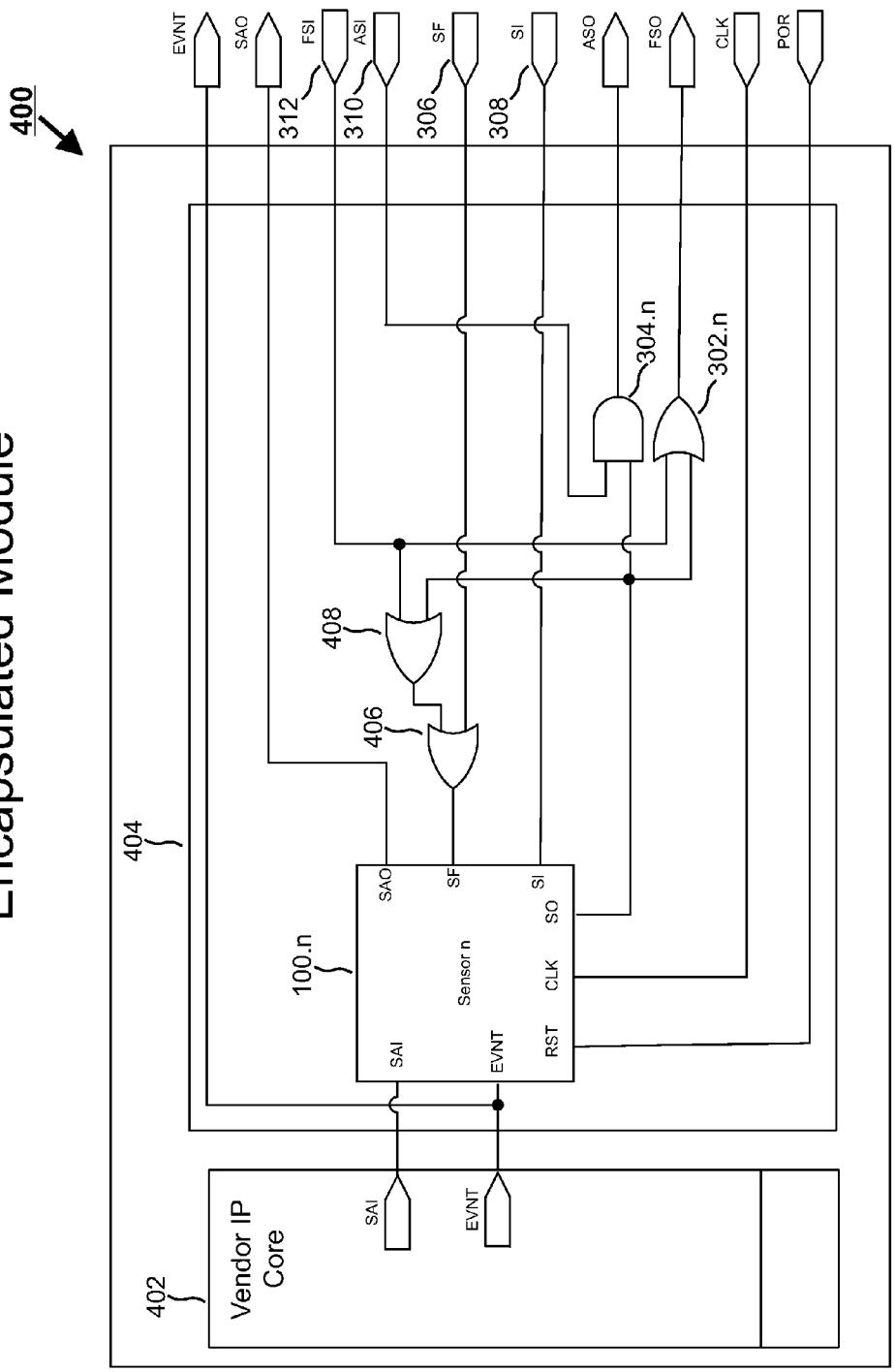
FIG. 4 is an example of an encapsulated module, integrating a sensor within an IP block as a single block.

FIG. 4 is an example of an encapsulated block 400 comprising an IP block from 402 and a sensor 100 plus other gates in an integrated block 404. The encapsulated module should be considered relative to the distributed aggregator example of FIG. 3. The block 404 includes the AND gate 304.$n$ and the OR gate 302.$n$ corresponding to the same gates of FIG. 3, with signals connected the same way. The block 404 also receives a signal SF corresponding to the signal on line 306 and a signal SI corresponding to the signal on line 308. To discourage a developer from making repeated attempts to defeat one or more signals in an effort to circumvent the security of the system, thereby being able to use unlicensed IP in a production mode, additional logic is provide as backup methods for enabling the force counter 104. To that end the signals FSI 312 and the local SO are provided to the inputs of OR gate 408, whose output is provided to an input terminal of an OR gate 406. OR gate 406 also receives the SF 306 signal. OR gates 406, 408 form a three input OR gate which may drive the local SF signal active (HIGH) of the local sensor 100.$n$. Thus an attempt to defeat the protection scheme by disabling any one of these signals will still result in the signal SAO eventually being corrupted, denying the experimenter with evidence as to the purpose of the disabled signal.

The entire encapsulated block 400 is loaded into the users EDA tool flow, for example a Xilinx ISE or Altera Quartus, for synthesis, placement and routing. The encapsulated block 400 is encrypted, including the internal signal names, to prevent a user from determining the purpose of a given signal from its name.

In the various aspects of this disclosure, a secure method of unlocking the logic is provided so that the developer may use the protected IP in a production mode, but only when such has been approved. Note that in a production system the force counter 104 has no function; it is never enabled. So in one aspect of the disclosure the setting of the initial value of the count register within the force counter 104 is compared to a unique KEY value that will unlock (disable) the protection system as discussed herein below. The net list of the logic being developed will not change, therefore a user cannot see any logical difference between the logic used for development and that released for production.

Figure 5:
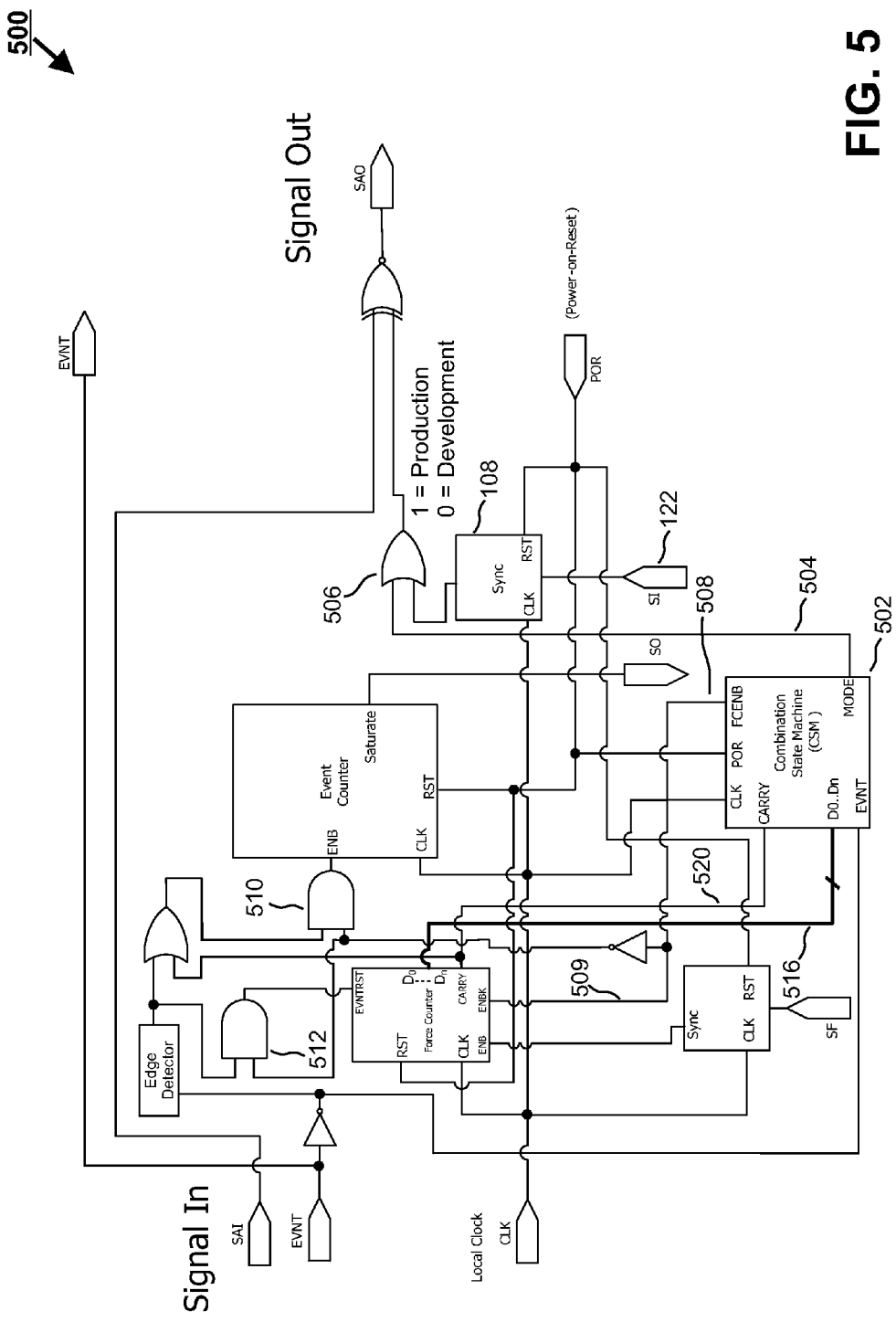
FIG. 5 is an example of one aspect of an apparatus for unlocking sensors.

The unlocking system is enabled by a system 500 exemplified by FIG. 5. The FIG. 5 circuit 500 is identical to that of FIG. 1, except that FIG. 5 also includes a combination state machine ("CSM") block 502, wherein the CSM 502 receives the EVNT, CLK, POR and CARRY signals, and provides FCENB and MODE signals, and the force counter has an additional KEY enable input, ENBK, connected to FCENB of the CSM. Those elements of FIG. 5 that repeat those of FIG. 1 will not be described again here in the interest of clarity and brevity.

In production mode (MODE=1) the initial value of the event counter is matched to a unique predetermined KEY value contained within the CSM. In a development mode (MODE=0) the force counter 104 is provided an initial value for its event counter that does not match the KEY value. When the CSM 502 commences operation, the CSM 502 asserts a signal ENBK to the force counter 104 on a line 509, and if a successful match results between the force counter 104 value and the KEY value contained within the CSM 502, the MODE output of CSM 502 goes HIGH (MODE=1) thus signaling an authorized production status to OR gate 506. The signal ENBK requests the force counter 104 to provide the value of its initial counter value to the CSM 502 on a bus 516. The counter initial value may be F bits per EQ1, or may be more than F bits to further impede guessing the KEY value by a developer. It's important to note that the netlist of the logic in development and production modes does not change, therefore a user cannot see any logical difference between the logic used during development and the logic released for production.

Figure 6:
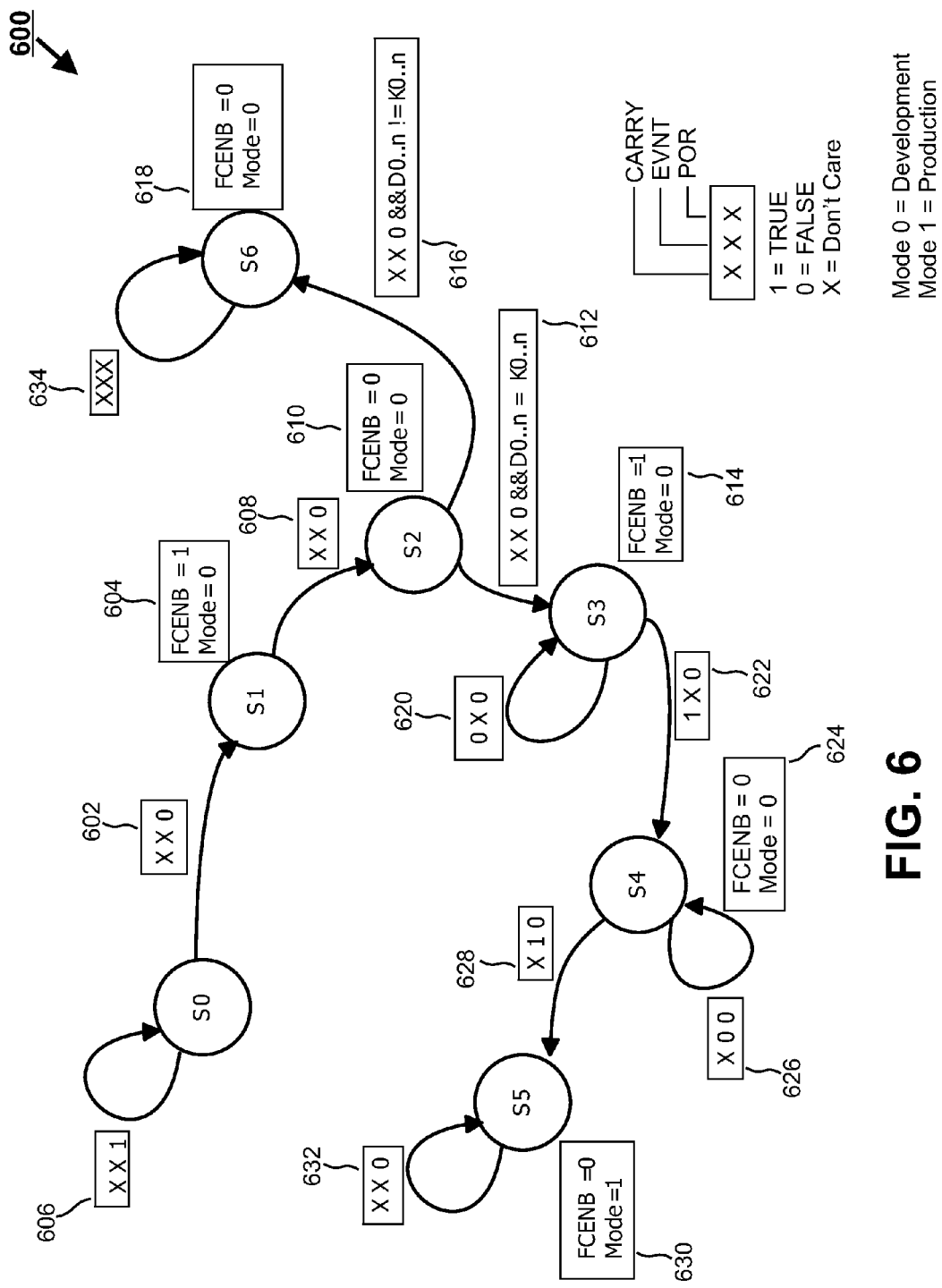
FIG. 6 is a state machine description of an aspect of the apparatus of FIG. 5.

The logic of the CSM may be understood from the example state machine 600 of FIG. 6. Note that all actions occur on a rising edge of the local clock signal CLK 117. The state machine includes seven states:

S0 Waiting for a POR FALSE signal
S1 Enabling the force counter 104
S2 Comparing a key to the force counter register value
S3 Waiting for a force counter CARRY signal
S4 Waiting for the EVNT signal to toggle
S5 Production mode
S6 Development mode In FIG. 6, the path between states is annotated with a condition that causes the state machine 600 to advance to the next state on a next rising CLK 117 edge and in some states a condition that may cause the instant state to persist. A system begins in state S0 upon assertion of a POR, looping in this state 606 so long as POR is active, then advancing to state S1 when the POR signal is inactive 602. At state S1 the signal FCENB is set to 1 and the Mode signal on line 504 (FIG. 5) is driven low. The Mode signal on line 504 is connected to an input terminal of two-input OR gate 506, thus the state of signal SI determines the function of XNOR 128. The signal FCENB on line 508 enables the force counter 104 whilst disabling the event counter due to the AND gate 510 and disabling EVNTRST due to the AND gate 512. AND gates 510 and 512 allow the system to settle down while POR and FCENB are active. Because the POR signal is inactive 608, the state advances to state S2 on the next rising edge of CLK 117. At state S2 FCENB is driven low whilst the Mode signal remains at zero. At state S2 the value of the force counter (D1 through $D_n$) is read on the bus 516 and compared 612 to the KEY value (K1 through $K_n$) which has been prepositioned in the CSM 502. Note that the force counter will have counted twice after the release of POR 602 before it was disabled (610), therefore a valid initial value for D will be K-2, assuming the force counter is an UP counter. If the words D+2 and K do not match 616 the state advances to S6, where Mode remains zero, FCENB is left at zero 618, and the system is permanently in state S6 until another POR signal is active. With FCENB at zero, the sensor will now behave as previously described for a development environment. Note that only assertion of a POR, not a logical reset signal, may take the system out of state S6. This prevents an unauthorized production user of a protected IP block from simply periodically resetting his design to use unlocked IP in a production mode.

If the words D+2 and K match 612 the state advances to state S3. At state S3 FCENB is again enabled so that the force counter will generate a CARRY signal on line 520, providing some settling time. The state remains in S3 so long as the CARRY is zero 620, advancing to state S4 when a CARRY is seen 622. At state S4 FCENB is again reset for the last time, Mode remains at zero, waiting for EVNT to toggle. When an EVNT signal is seen 628 the system advances to state S5, where Mode is driven to a 1 and the state remains at S5 until a new POR is generated. When Mode is set high, the output of the OR gate 506 is driven high, therefore per the truth table previously discussed XNOR output SAO will now follow the received value of SAI thus signaling an authorized production status.

Figure 7:
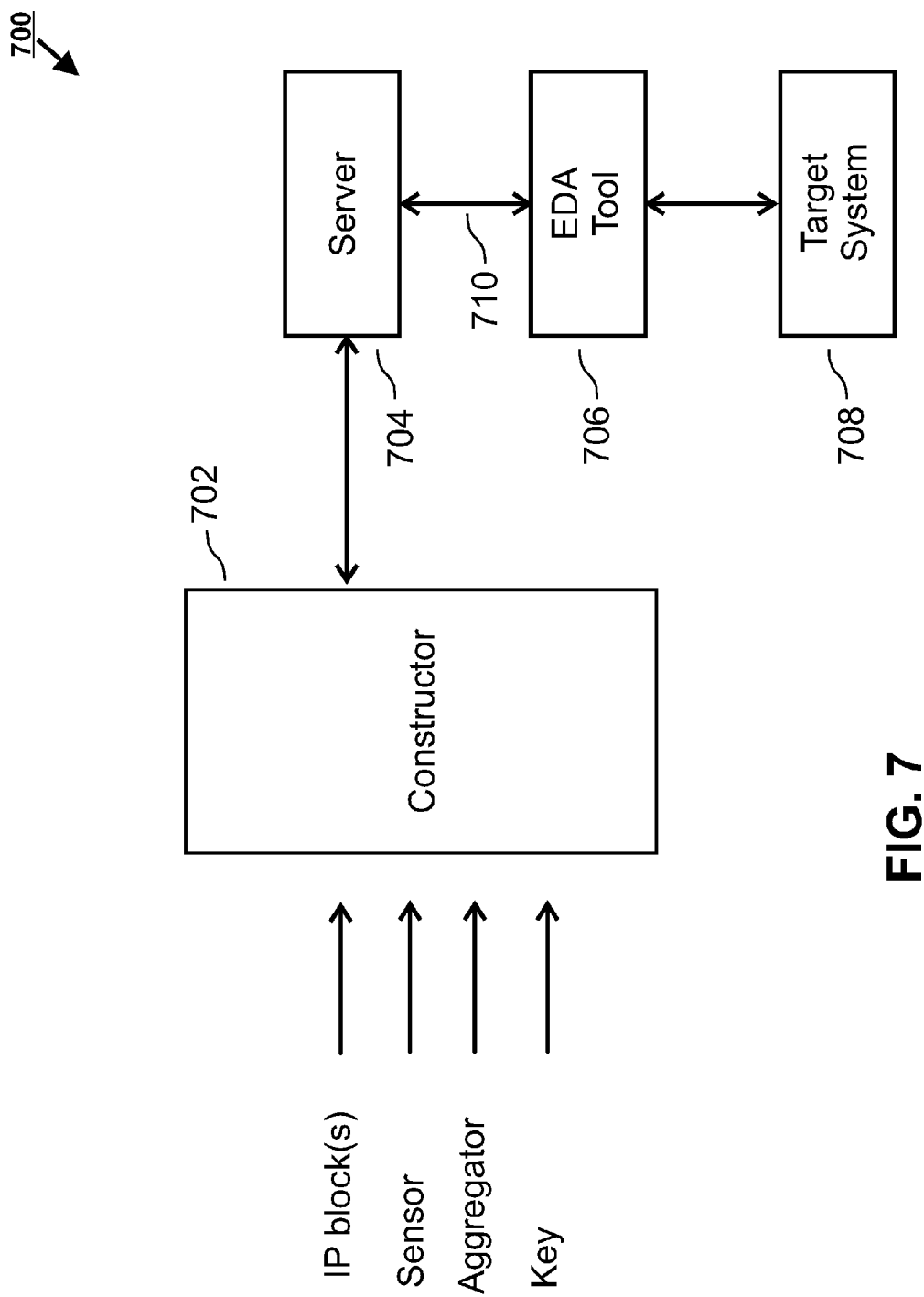
FIG. 7 is an example of a system for combining the various aspects of the disclosure for use by a user's EDA tool flow.

Turning to FIG. 7, an example is shown for the construction of an embodiment of the various aspects of the disclosed system 700. In the various embodiments a constructor 702 is a program, executed by a server 704, whereby the server 704 receives requests from an EDA tool 706 or other means requesting certain IP blocks. The blocks may be from third party vendors and other sources. The server 704 may be a dedicated system or a "cloud" server. For each requested IP block the constructor 702 selects the block logic, one or more sensors 600, the value of F of EQ1 and a KEY for each sensor. For a development build, the initial value of the force counter 104 may be a random value that is not equal to KEY-2 where KEY may be another random value inserted into the CSM 502. The constructor 702 combines the randomly selected value for each sensor for inclusion in the code and data delivered to an EDA tool flow 706.

An aggregator (centralized 200 or distributed 300) may be added, and the entire system of blocks, sensors and aggregator (the Secure System) is then combined into a single net list by the EDA tool flow 706. In some embodiments the IP blocks, sensors and aggregator are encapsulated and the various signals and elements encrypted, as disclosed in relationship to FIG. 4, as an encapsulated module 400. The source code of the resulting Secure System may be stored at the server 704, then provided to an EDA tool 706 to create a bit stream suitable for programming a programmable device on the target system 708. The bit stream file may be downloaded via the internet 710 or other suitable means, and may be exercised on a target system 708, wherein the target system 708 may represent a final product or a verification platform. Alternatively some developers may use simulation as the target system 708.

When one or more IP blocks are purchased or their use otherwise authorized, the constructor 702 may create a bit stream all over again or otherwise change the force counter 104 initial value and/or the KEY value as appropriate for production mode, as disclosed hereinbefore. In some aspects of the present disclosure an IP block owner may specify one or more rules dictating how many times a certain user may receive a production build, i.e., including an "unlock" KEY value, for the specific block. The rules may include a number of times or unlimited times, with or without a time window or other restrictions. The server 704 keeps track of the number of production builds against the rules, and incorporates a production KEY or a development KEY in accordance with the associated rule. For a production build the KEY in the CSM 502 is configured such that the block will be unlocked, as disclosed regarding the system 500 and the process 600.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An electrical circuit ("a sensor") for controlling signals from a one or more logical blocks, each logical block electrically connected to a corresponding sensor, each sensor comprising:
   a first event counter including a first input terminal for counting, electrically connected in parallel with a first signal, wherein the first event counter counts transitions of the first signal and activates a saturation output signal when the number of transitions at the first input terminal exceeds a first predetermined count value;
   a modifying circuit with an input terminal for receiving a second signal and the saturation output signal, wherein an output of the modifying circuit corresponds to the second signal when the saturation output signal is inactive and is a corrupted version of the second signal when the saturation output signal is active.

2. The circuit according to claim 1, wherein the modifying circuit comprises a XNOR gate receiving the second signal and a version of the saturation output signal.

3. The circuit according to claim 2, further comprising a synchronizer in series with the saturation output signal.

4. The circuit according to claim 3, wherein the synchronizer comprises flip-flops with a feedback signal.

5. The circuit according to claim 3, wherein the synchronizer comprises a Muller-C gate with an output signal connected to an input terminal of said gate.

6. The circuit according to claim 1, wherein the first event counter is reset by a power on reset ("POR") signal.

7. The circuit according to claim 1, wherein the first signal and the second signal are electrically connected.

8. The circuit according to claim 1, wherein the sensor further comprises a second event counter comprising:
   a second input terminal for counting transitions of a clock signal;

a third input terminal for restarting the counter, electrically connected in parallel with the first signal; and an output terminal for a carry out signal, wherein the carry out signal is logically connected to an OR gate with the first signal, the output of the OR gate connected to the first input terminal of the first event counter, wherein the second event counter generates a carry out signal when the count exceeds a second predetermined value unless the counter is restarted by a transition of the first signal on the third input terminal.

9. The circuit according to claim 8, further comprising an aggregator, wherein the aggregator comprises:

means for determining when a first of a plurality of saturation output signals is active;

means for enabling the second event counters in all sensors;

means for determining when all saturation signals are active; and means for providing an active version of the saturation signal to all of the modifying circuits.

10. The circuit according to claim 9, further comprising logic configured to enable or disable the modifying circuit to provide an output signal that is a corrupted version of the first signal, wherein the logic is electrically connected to the carry out signal from the second event counter, the POR, and a bus providing signals corresponding to a counter register in the second event counter.

11. The circuit according to claim 10, wherein the logic is a combination state machine ("CSM"), wherein the CSM is configured to execute the steps of:

a. beginning when POR is asserted;
b. waiting for the POR to be inactive;
c. enabling the second event counter to count;
d. preventing the second event counter from counting;
e. bit-wise comparing the instant value of the count register to a predetermined key, and if there is no match then terminating until the POR is active, then restarting from Step (a), else;
f. waiting for an active carry out signal from the second event counter;
g. waiting for a transition of the second signal;
h. providing a signal to the modifying circuit such that the modifying circuit output signal corresponds to the second signal;
i. waiting for the POR to be active, then restarting from step (a).

12. A method comprising:

selecting an electronic circuit logical block from a library of logical blocks, the selected circuit including a first signal and a second signal;

merging a sensor with the logical block, the sensor comprising:

a first event counter including a first input terminal for counting, electrically connected in parallel with the first signal, wherein the event counter counts transitions of the first signal and activates a saturation output signal when the number of transitions at the first input terminal exceeds a first predetermined count value; and a modifying circuit with an input terminal for receiving the second signal and the saturation output signal, wherein an output of the modifying circuit corresponds to the second signal when the saturation output signal is inactive and is a corrupted version of the second signal when the saturation output signal is active;

generating a netlist of all merged circuits; and saving the netlist on a server.

13. The method of claim 12, further including merging a second event counter, wherein the second event counter comprises:

a second input terminal for counting transitions of a clock signal;

a third input terminal for restarting the second event counter, electrically connected in parallel with the first signal; and an output terminal for a carry out signal, wherein the carry out signal is logically connected to an OR gate with the first signal, the output of the OR gate connected to the first input terminal of the first event counter, wherein the second event counter generates the carry out signal when the count exceeds a second predetermined value unless the counter is restarted by a transition of the first signal on the third input terminal.

14. The method of claim 13, further comprising:

selecting one or more additional logical blocks from the library wherein each additional logical block is merged with an additional sensor;

connecting the saturation output signals of all sensors with an aggregator comprising:

means for determining when a first of a plurality of saturation output signals is active;

means for determining when all saturation output signals are active; and means for providing an active version of the saturation output signal to all of the modifying circuits.

15. The method of claim 14, further including providing the netlist as a bitstream to an EDA tool via an electronic network.

16. The method of claim 15, wherein the network is a local area network.

17. The method of claim 15, wherein the network is an internet connection.

* * * * *